United States Patent Office 2,730,149
Patented Jan. 10, 1956

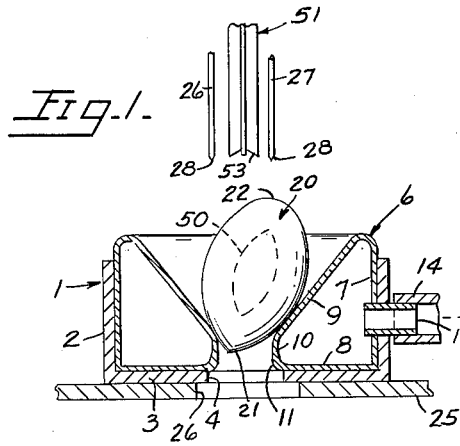

2,730,149

METHOD OF PITTING FRUIT

John G. Aguilar, Concord, and George W. Brown, Berkeley, Calif.

Application October 7, 1952, Serial No. 313,556

10 Claims. (Cl. 146—227)

This invention relates to a method of pitting fruit and more particularly to a method of removing the pit from fruit such as prunes, cling peaches and the like, in which the pit is tightly adhered to the meat of the fruit.

Heretofore various attempts have been made to pit cling peaches with varying degrees of success. Regardless of the method employed, commercial pitting of such fruit has been characterized by the complexity of the method and apparatus required. In this connection it should be noted that the meat of cling peaches is adhered to the pit by fibers of the meaty-like material which conform to the irregular surface of the pit thus adding to the adhesive resistance of the fibers themselves.

The pitting of cling peaches has, in the past, been accomplished by cutting out the pit with sharp knives. This process necessitates halving the fruit first and then holding it so that the knives may scoop out the pit. In order to insure removal of the pit it is usually necessary to cut out a substantial amount of meat thus diminishing the usable amount of fruit. In addition the machinery for performing this operation is extremely complicated, has high initial and maintenance costs and substantially increases the price of the product to the consumer. In the case of cling peaches it has not heretofore been possible to can whole pitted peaches despite the fact that the halving process reduces the desirability of the product in many instances.

In the case of prunes, no successful method has been evolved for removing the pits and the same must be removed by the consumer when the prunes are eaten. The only alternative is removal of the pit by hand which is at best a tedious process and which results in complete mutilation of the fruit. The average purchaser cannot buy pitted prunes and if the same are requested of a packer the cost is increased many times because of the great amount of manual work involved.

The main object of the present invention is therefore the provision of a novel method for removing the pit from whole fruit in which the pit is tightly adhered to the meat of the fruit without halving such fruit or otherwise mutilating it.

Another object of the invention is the provision of a method for pitting whole fruit which lends itself to large scale commercial operation.

Still another object of the invention is the provision of a method for pitting whole fruit which may be carried on economically so as not to increase the price of the pitted fruit to any substantial degree.

Other objects and advantages will be seen from the following specification and from drawings wherein:

Fig. 1 is a cross-sectional view through the holding means for the fruit and showing a fruit in elevation and indicating a fragmentary portion of the pitting means.

Fig. 2 is a cross-sectional view through the holding means of Fig. 1 but showing the same in holding position in engagement with the fruit with the latter shown in section and with the electrodes inserted into the fruit.

Fig. 3 is a horizontal cross-sectional view through the structure of Fig. 2.

Fig. 4 is a semi-schematic side elevational view of an apparatus by which the present invention may be carried out and showing the holding means in elevation and partially broken away and in section to show internal structure.

Fig. 5 is a horizontal cross-sectional view through the apparatus of Fig. 4 as taken along lines 5—5 of Fig. 4.

Fig. 6 is a fragmentary view of the device of Fig. 2 showing a modified form thereof.

Although it will be obvious that the present invention may be employed for pitting almost any type of fruit the same will be described in connection with pitting prunes, an operation which is, at present, impossible commercially.

In the drawings certain apparatus is illustrated to facilitate explanation of the method but it will be understood that the present invention is not intended to be restricted to one type of operation and may be carried out by different devices.

Referring to Figs. 1–3 a holder for positioning the fruit is shown comprising an annular support generally designated 1 and including a vertically disposed annular side 2 and a horizontal radially inwardly extending flange 3 defining a central opening 4.

Positioned within the annular support 1 is a tubular member 6 of yieldable material such as rubber or plastic. In cross-section member 6 comprises an outer vertical sidewall 7 abutting side 2 of support 1 and a bottom annular side 8. Extending between the upper edge of sidewall 7 and the inner edge of bottom 8 the member 6 is provided with a slanting, frusto-conical inner side 9 on which the fruit may be placed. (Fig. 1.)

In the position of Fig. 1 the juncture between slanting side 9 and bottom 8 preferably includes a relatively short vertical portion 10 and a portion 11 which is substantially thicker than the remainder of the sides of member 6 for a purpose to be described.

The vertical side 2 of holder 1 and the vertical sidewall 7 of member 6 are correspondingly apertured to receive therethrough a short nipple 13 which extends through said sides and terminates at its inner end in the hollow space formed by member 6. To the outer end of nipple 13 is secured an air conduit 14 which leads from an air tank 15 to which air under pressure is supplied from a suitable compressor 16. In air conduit 14 is a conventional two-way cock 17 having a suitable discharge line 18 to the atmosphere. It will be apparent that, by operation of cock 17, pressure may be applied to yieldable tubular member 6 as desired to expand the same to the position of Fig. 2. By exhausting the member 6 to the atmosphere the same will automatically return to the normal shape shown in Fig. 1 by virtue of the resiliency of its sidewalls.

In the operation of the holder, the fruit 20 is placed in the conical space defined by the inner sidewall 9. The fruit need not be oriented in any particular way as it will normally take a position such as shown in Fig. 1. However, it is preferable, for reasons which will subsequently be explained, to place the fruit in the holder with its stem end 21 down and its blossom end 22 up.

When cock 17 is actuated to apply air pressure to the member 6 the latter will expand and grip the fruit around the periphery of the latter at points between the stem and blossom ends (Fig. 2). The frusto-conical shape of the sidewall 9 insures proper gripping of the fruit and there is no tendency for the latter to be ejected from the holder because the lower end of the fruit is positioned within or adjacent the opening defined by the short vertical sidewall 11.

It will be apparent that any fruit which is substantially a solid of revolution may be held by the member 6. Pears, for example, although of changing cross-section throughout their length may be firmly but yieldably held by member 6, the size of the latter being obviously variable to suit fruit of widely varying size. However, it should be noted that for one particular type of fruit the member 6 is inherently adapted to take fruit of different sizes.

The support 1 may, in turn, be supported in any suitable manner as by plate 25 and the latter may be provided with an aperture 26 concentric with the central opening 4 of support 1 and the central opening of member 6 defined by the short vertical portion 10.

It will be apparent that the use of the holder above described results in the fruit being held with the blossom and stem ends in vertical alignment (Fig. 2). Stated another way, a fruit having major and minor axes will be held with the major axis vertical and, as is usually the case, the pit will be disposed in the same manner.

The present invention contemplates the removal of the pit by first reducing the intensity of the adhesion between the pit and the adjacent meat of the fruit and thereafter removing the pit.

One method of accomplishing this result is disclosed in Figs. 1–5 and comprises a pair of generally elongated electrodes 26, 27 which are pointed at one end as at 28 (Figs. 1, 2, 4) for insertion into the fruit. The electrodes 26, 27 are preferably parallel and spaced apart a distance slightly greater than the minor diameter of the pit of the fruit so that upon insertion of the electrodes into the fruit from the blossom end, and in a direction parallel to the major axis of the fruit, the electrodes 26, 27 may be brought to a position straddling the pit as best seen in Fig. 2.

To facilitate handling the electrodes, the same may be imbedded in a generally rectangular block 29 of dielectric material such as hard rubber or a suitable plastic. The ends of electrodes 26, 27 opposite the pointed ends 28 project from the upper side of block 29 and are provided with connectors 30. An electrical circuit 31 is provided so as to include said connectors and is connected with a source of electrical energy 32. (Fig. 4.)

A convenient method of supporting block 29 is to provide a pair of slides 35, 36 (Figs. 4, 5) secured to the opposite laterally outwardly facing sides of block 29 and provide corresponding sets of vertically disposed guides 37, 38 which are adapted to slidably receive said slides. The guides 37, 38 may be secured to frame members 39, 40 respectively which are supported over the fruit holder 1 in any convenient manner and attached to guides 37, 38 by bolts 41.

Springs 42, 43 may be secured at one of their ends to slides 35, 36 of block 29 and at their other ends to frame members 39, 40 at points above said block (Fig. 4) so as to yieldably urge said block upwardly at all times. By pulling downwardly on block 29, which may be provided with a handle 45 for this purpose, the operator can cause the electrodes 26, 27, to pierce the fruit 20 and enter the meat of the latter to the position shown in Fig. 2 and shown in Fig. 4 in dotted lines. By providing stops 46 at the lower ends of frame members 39, 40 for engaging slides 37, 38 a predetermined lowermost position of said electrodes may be established so that said electrodes straddle the pit of the fruit as above described.

Circuit 31 may be energized at all times if desired but in the interests of safety it is preferable to provide means such as switch 47 (Fig. 4) for closing the circuit only when the electrodes are inserted in the fruit. To this end switch 47 may be attached to one of the guides 37 and a projection 48 secured to slide 35 so as to actuate said switch to close circuit 31 when block 29 is in its lowermost position (Fig. 4).

It will be therefore apparent when electrodes 26, 27 are in the position of Fig. 2 that a current will flow between said electrodes and through the meat of the fruit adjacent the pit 50. Some current will also flow through pit 50. The result of this action is that the fruit will be heated because of the electrical resistance to the flow of current offered by the meat of the fruit and the pit.

We have found that by impressing a potential of about 300 volts across the electrodes 26, 27 at a power consumption of about 80 watts the temperature of the fruit adjacent the pit may be raised sufficiently to create steam from the moisture of the fruit in a few seconds. The voltage, power consumption and duration of application are not critical but the heat created should not be great enough to burst the fruit. Obviously the power consumption and duration of application of the current may be varied as desired depending on the type of fruit to be pitted.

The result of the localized application of heat as above described is that the adhesion between the pit and the fibers of the meat attached thereto is considerably reduced if not completely eliminated and the pit is then easily removed from the fruit.

A simple method of pitting the fruit is to provide an elongated pitter generally designated 51 (Figs. 4, 5) having one end formed to provide two perpendicularly intersecting flat elements 52 terminating in downwardly opening notches 53 (Figs. 1, 2) at their lower ends which are adapted to engage the upper end of the pit 50. The notches 53 prevent the pitter 51 from slipping off the pit.

The pitter 51 is slidably received in a central vertically extending opening 54 in block 29 (Fig. 5) and slidably received in a bearing 55 positioned above block 29 and secured by arms 56 to frame members 39, 40. The upper end of pitter 51 is provided with a handle 58 adapted to be grasped by the operator. Springs 60 extending upwardly from the upper end of pitter 51 and secured to frame members 39, 40 at their upper ends yieldably urge the pitter 51 upwardly at all times (Fig. 4).

In operation, after the fruit has been heated adjacent the pit, the pitter 51 is forced downwardly through the fruit pushing the pit 50 ahead of it and through the lower side of the holder 1 and supporting plate 25 (Fig. 4). It will be understood that the behavior of the pit after the heating step is performed is somewhat the same as it would be if it were a "freestone" such as are found in apricots and freestone peaches.

The thickened portion 11 of the holding member 6 provides a relatively uniform orifice through which the pit is pushed and there is no tendency for the pitter 51 to force large sections of the meat of the fruit through said orifice because the fruit is firmly held all around its bottom end through which the pit is ejected. It will be obvious to those skilled in the art that the pitter may be inserted from the bottom (or stem) end and the pit ejected through the top (or blossom) end. However, the method illustrated in Fig. 4 is preferable because the skin of the fruit is somewhat weakened along its upper side by the electrodes 26, 27 and there is a greater tendency for the pit 50 to carry the meat of the fruit adjacent the upper side along with it if the surface of the fruit is pierced.

By the above described method there is no tendency for the fruit to be shifted downwardly from its position of Fig. 2 because the thickened annular portion 11 is smaller in diameter than the minor diameter of the fruit and furthermore the sidewall 9 of member 6 exerts a uniform radially inwardly directed force on the periphery of the fruit thus holding it firmly in place.

Although the method herein described of heating the fruit adjacent the pit is preferred, we do not intend to be limited to such a particular method as it is obvious that other methods may be employed.

For example in Fig. 6 is disclosed a method of heating by steam which may be employed with somewhat the same apparatus as above described. In place of the electrodes 26, 27 a pair of relatively slender rigid pipes 70, 71 are provided which are pointed at their lower ends for piercing the fruit and which are provided adjacent said lower ends with oppositely inwardly directed openings 72, 73 through which steam may be forced under pressure for locally heating the fruit adjacent the pit. Flexible conduits 74, 75 may be connected to the upper ends of said pipes and connected with a source of steam (not shown). In place of the switch 47 of Fig. 4 a steam valve or valves may be provided for actuation by block 29 to apply steam to the interior of the fruit only after the pipes 70, 71 are lowered to the position shown in Fig. 6.

It may be added that orientation of the fruit with its blossom end up is preferred because less mutilation of the fruit results when the pitter enters from the blossom end. In the case of those fruits which do not have well defined blossom and stem ends the pitter may enter from either end but in the case of drupes and the like, the pitter should enter from the blossom end.

The very detailed description herein made is not to be taken as restrictive of the invention as it is obvious that minor variations may be made without departing from the spirit of the invention as defined in the following claims.

We claim:

1. The method of pitting a fruit having a pit comprising the steps of: heating that portion only of the fruit adjacent said pit to reduce the adhesion between the meat of said fruit and said pit without substantially heating the remainder of the meat of said fruit and thereafter removing said pit.

2. The method of pitting a fruit having a pit comprising the steps of: locally heating said fruit adjacent said pit to a point at which the moisture in said fruit vaporizes and reduces the adhesion between said pit and the adjacent meat of said fruit and thereafter removing said pit.

3. The method of pitting a fruit having a pit comprising the steps of: passing an electric current through the portion of said fruit adjacent said pit to reduce the adhesion between said pit and the meat of said fruit and thereafter removing said pit.

4. The method of pitting a fruit having a pit comprising the steps of: introducing a pair of electrodes into said fruit to positions on opposite sides of said pit, passing an electric current between said electrodes and through that portion of the fruit adjacent said pit thereby heating said portion and thereafter removing said pit.

5. The method of pitting a fruit having a pit comprising the steps of: introducing a pair of electrodes into said fruit from one side of the latter to positions on opposite sides of said pit, passing an electric current between said electrodes and through that portion of the fruit adjacent said pit thereby heating said portion and thereafter applying a force to said pit from said one side and pushing said pit out of said fruit through the side opposite said one side.

6. The method of removing the pit from a fruit having major and minor axes comprising the steps of: positioning the fruit with the major axis of the same vertical, grasping the periphery of the fruit about its minor diameter and exerting radially inwardly directed forces on said periphery, inserting a pair of electrodes from the upper side of said fruit into the meat thereof to positions on opposite sides of said pit, passing an electric current between said electrodes and through the meat adjacent said pit thereby heating the fruit adjacent said pit and thereafter applying a downwardly directed force on the upper side of said pit and forcing the latter out of said fruit through the bottom side thereof.

7. The method of removing the pit from a fruit having opposite blossom and stem ends comprising the steps of: positioning the fruit with the blossom-stem axis vertical and the blossom end uppermost, grasping the periphery of the fruit at points between said ends and exerting radially inwardly directed forces on said periphery, inserting a pair of electrodes into the meat of said fruit through said blossom end to positions on opposite sides of said pit, passing an electric current between said electrodes thereby heating the fruit adjacent said pit and thereafter applying a downwardly directed force along said blossom-stem axis on the upper side of said pit and forcing the latter out of said fruit through said stem end.

8. The method of pitting a fruit having a pit comprising the steps of: introducing steam to the central portion only of the fruit adjacent said pit thereby heating said portion and reducing the adhesion between said pit and the meat of said fruit and thereafter removing said pit.

9. The method of pitting a fruit having a pit without cooking such fruit comprising the steps of: locally heating said fruit adjacent said pit to a point at which the moisture in said fruit vaporizes and reduces the adhesion between said pit and the adjacent meat of said fruit and simultaneously maintaining the bulk of said meat outwardly of said pit substantially uncooked, and thereafter removing said pit.

10. The method of pitting a fruit having a pit without cooking such fruit comprising the steps of: heating that portion only of the fruit adjacent said pit to reduce the adhesion between the meat of said fruit and said pit without substantially heating the remainder of the meat outwardly of said pit and thereafter forceably pushing said pit out of said fruit.

References Cited in the file of this patent

UNITED STATES PATENTS

| | | |
|---|---|---|
| 845,695 | Converse | Feb. 26, 1907 |
| 1,250,140 | Chapman | Dec. 18, 1917 |
| 2,601,421 | Thaning | June 24, 1952 |